L. J. HYATT.
TRAFFIC SIGNAL FOR MOTOR VEHICLES.
APPLICATION FILED NOV. 24, 1917.
1,287,326.
Patented Dec. 10, 1918.
2 SHEETS—SHEET 2.
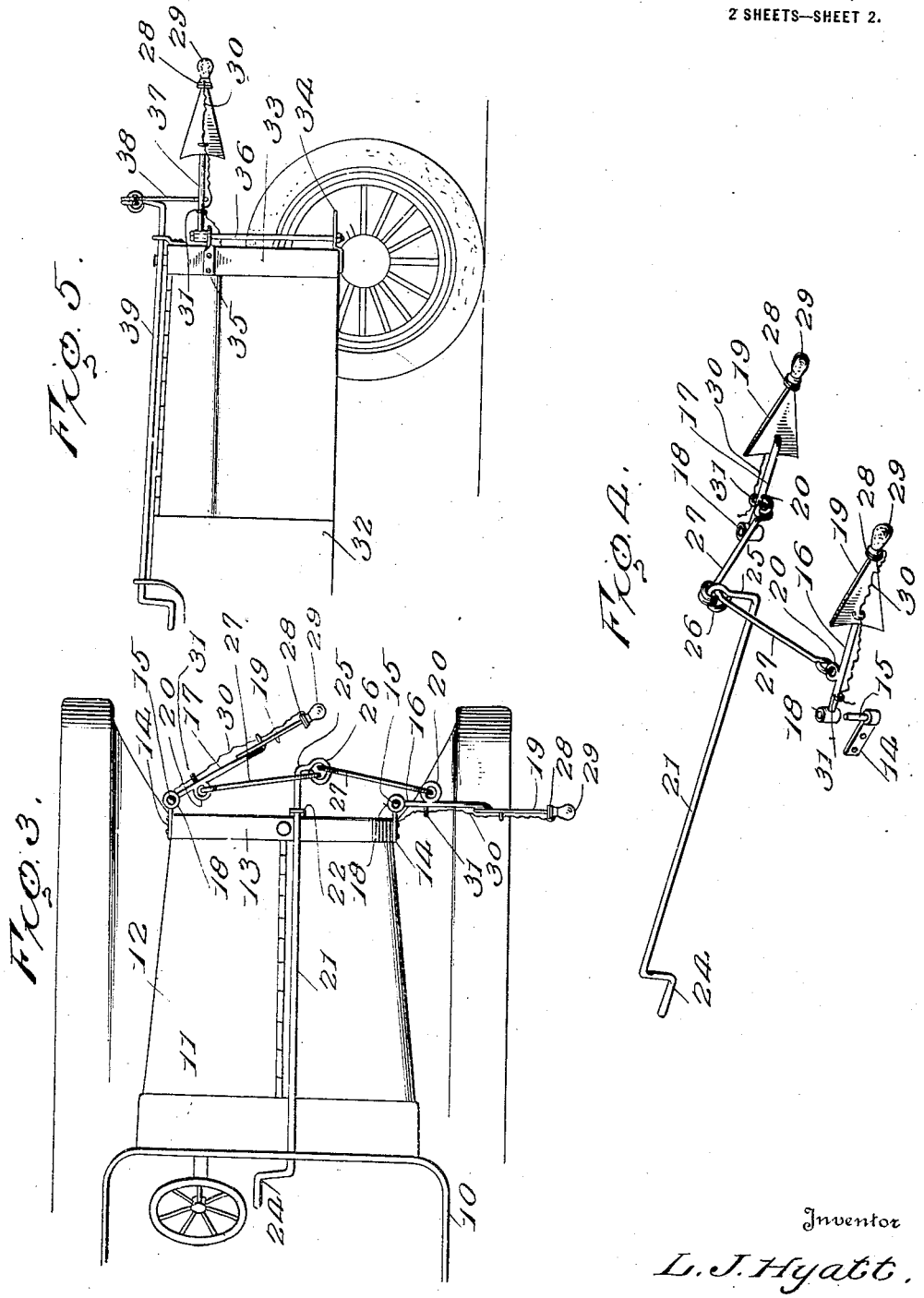
Inventor
L. J. Hyatt,
By
Attorneys

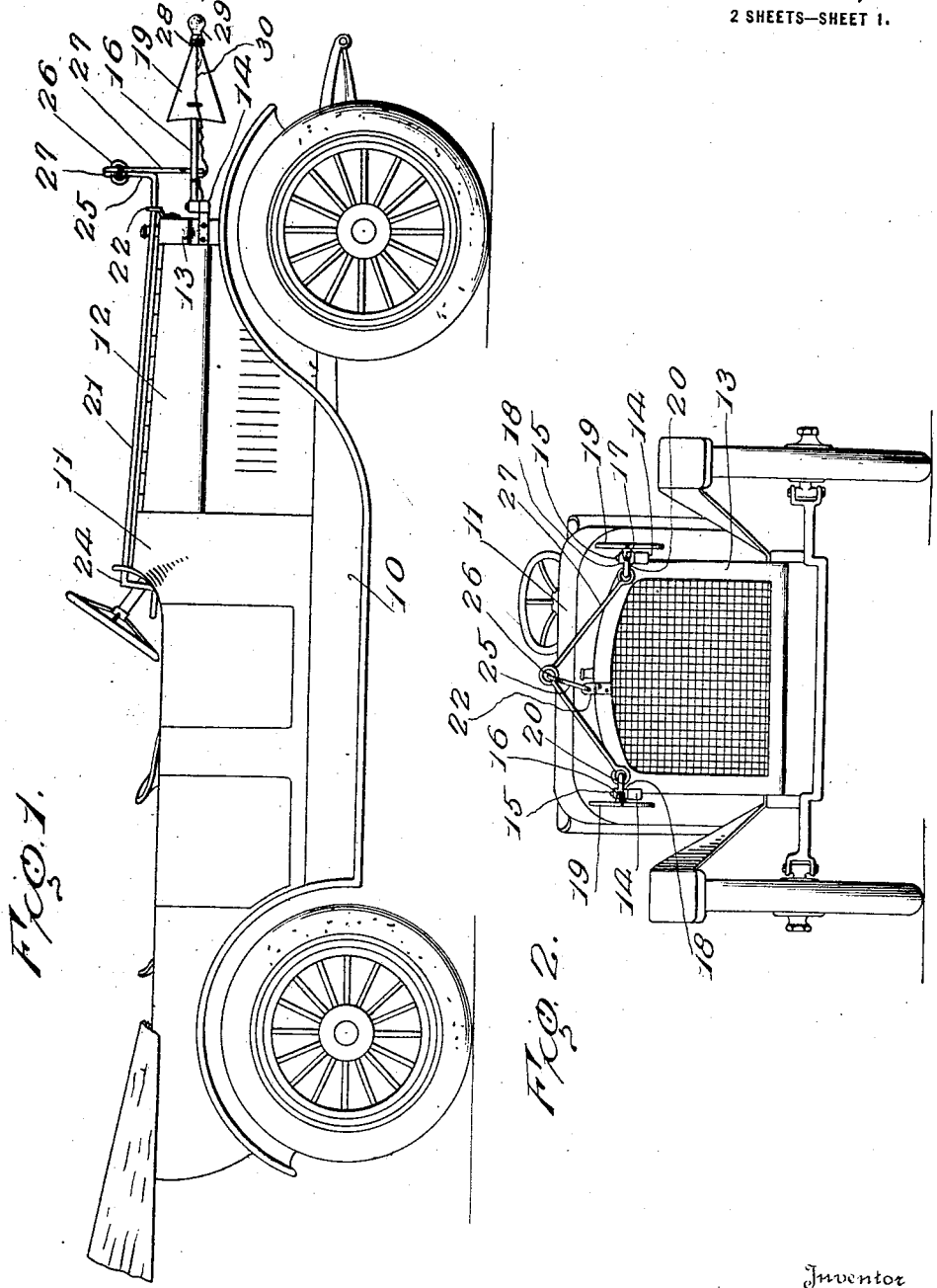

UNITED STATES PATENT OFFICE.

LEON J. HYATT, OF PUEBLO, COLORADO.

TRAFFIC-SIGNAL FOR MOTOR-VEHICLES.

1,287,326.  Specification of Letters Patent.  Patented Dec. 10, 1918.

Application filed November 24, 1917. Serial No. 203,792.

*To all whom it may concern:*

Be it known that I, LEON J. HYATT, a citizen of the United States, residing at Pueblo, in the county of Pueblo and State of Colorado, have invented certain new and useful Improvements in Traffic-Signals for Motor-Vehicles, of which the following is a specification.

This invention relates to an improved traffic signal for motor vehicles and has as its primary object to provide a device of this character whereby a driver may readily indicate to a vehicle approaching or to a vehicle following, an intention to turn either to the right or left.

The invention has as a further object to provide a signal which will preferably be arranged at the front of the vehicle and manually operable from the driver's seat.

And the invention has a still further object to provide a traffic signal which may be readily applied to substantially any conventional type of motor vehicle as now in common use.

Other and incidental objects will appear as the description proceeds and in the drawings wherein I have illustrated the preferred embodiment of the invention and wherein similar reference characters designate corresponding parts throughout the several views:

Figure 1 is a side elevation showing my improved signal applied to a conventional type of vehicle, Fig. 2 is a front elevation illustrating the indicators of the signal in normal position or inactive, Fig. 3 is a top plan view showing the indicators of the signal swung for indicating an intention to turn to the right, Fig. 4 is a perspective view showing the device detached, and Fig. 5 is a fragmentary side elevation showing a slightly modified form of the invention.

In order that the construction, mounting and operation of my improved signal may be accurately understood, I have, in the drawings, shown the device in connection with a conventional type of motor vehicle 10 having a cowl 11, hood 12 and radiator 13. Coming now more particularly to the subject of the present invention, I employ angle-brackets 14 which are, as particularly shown in Fig. 2 of the drawings, secured to opposite sides of the vehicle radiator 13 adjacent its upper extremity. These brackets project forwardly from the said radiator and at their outer extremities are formed with upstanding pintles 15. Mounted to swing upon the said brackets are complemental indicators 16 and 17 respectively. These indicators are preferably formed with relatively long shanks at the inner ends of which are arranged bearing sleeves 18 fitting over the pintles 15 of the supporting brackets. At their outer ends, the shanks of the said indicators are equipped with suitable arrow heads 19 which are preferably painted a suitable color for attracting attention. At oppositely disposed points intermediate of the ends of the indicator shanks, the said shanks are further provided with apertured lugs or eyes 20.

Journaled through the cowl 11 of the vehicle and extending forwardly above the hood 12 thereof, is an operating rod 21 which, adjacent its outer extremity, is rotatably supported by a bearing bracket 22 secured to the front face of the radiator adjacent the radiator cap. At its inner end, the rod 21 is provided with an operating crank 24 while at its outer end, the said rod is bent to provide a second crank 25 terminating in a loop 26. Freely connected to the said loop are links 27 the outer ends of which are loosely engaged through the eyes 20 of the indicators 16 and 17. The indicators are thus connected for simultaneous movement in either direction by means of the operating rod 21.

Normally, the indicators 16 and 17 will stand inactive projecting forwardly from the front end of the vehicle, as shown in Figs. 1 and 2 of the drawings. However, as will now be clear, should the driver intend to turn to the right, the crank 24 may be accordingly operated to swing the indicator 16 outwardly to a position projecting laterally with respect to the vehicle. Thus, any one approaching or following in the rear of the vehicle may be easily apprised of such intention of the driver. In like manner, should the driver intend to turn to the left, the crank 24 will be moved in the opposite direction to swing the indicator 17 outwardly so that it may be observed by either a person approaching the vehicle or a person following in the rear of the vehicle. Thus, a signal may be easily given for indicating an intention of the driver to turn either to the right or left. In this connection, it is to be noted that the inner extremity of the operating rod 21 extends within the forward seat compartment of the vehicle to terminate adjacent the steering wheel so that the crank 24 upon the said rod may consequently be easily operated from the driver's seat. In some instances, it may be desired to mount the indicators at the rear of the vehicle or at some other suitable location thereon and the present invention therefore contemplates such minor variations. However, in each instance, the indicators of the signal will be connected with and operated from an operating rod therefor as in the preferred embodiment of the invention shown.

In order that the signal may be used at night, the outer ends of the arrow head 19 are equipped with lamp sockets 28 in which are removably fitted electric lamps 29. Leading from the said sockets are circuit wires 30 supported at their outer extremities by loops 31 upon the shanks of the indicators, and thence directed into the hood 12 to be connected with a suitable source of electrical energy upon the vehicle. When the indicators are swung, as previously described, for giving a signal at either the right or the left of the vehicle, the lamps at the outer ends of the said indicators will be readily visible so that such signal may be readily observed.

In Fig. 5 of the drawings, I have illustrated a slight modification of the invention which relates more particularly to the mounting of the indicators of the signal. In this figure, the forward portion of a conventional type of motor vehicle has been indicated at 32. This vehicle is provided with a radiator 33 at the lower edge of which is mounted a splash guard 34, such guards being found upon certain types of motor vehicles. In carrying out the modification, brackets 35 are employed. These brackets are secured to opposite sides of the radiator adjacent its upper extremity and project forwardly therefrom to receive vertical rods 36 the lower ends of which are extended through the splash guard 34 and secured therebeneath for removably holding the said rods in position. Swingingly mounted upon the upper ends of the said rods and supported by the brackets 35 are indicators 37. These indicators are identical with the indicators of the preferred construction and are connected in a similar manner by links 38 with an operating rod 39 corresponding to the operating rod previously described and similarly mounted. It will be seen that this modified structure provides a very simple arrangement for securely connecting the indicators with the vehicle while, at the same time, the said indicators may be readily removed when desired.

Having thus described the invention, what is claimed as new is:

1. A traffic signal for motor vehicles including companion indicators mounted to swing horizontally upon the vehicle adjacent opposite sides thereof, an operating rod journaled upon the vehicle and provided at its outer extremity with a crank, and links connecting the said indicators with the said crank, the rod being rotatable for swinging the indicators to respectively project laterally at each side of the vehicle.

2. A traffic signal for motor vehicles including supporting brackets secured to opposite sides of the vehicle radiator, companion indicators mounted to swing horizontally upon the said brackets and normally lying within the lines of the vehicle, a bearing bracket upstanding from the radiator between said first-mentioned brackets, an operating rod journaled through the cowl of the vehicle and supported at its outer end by the said bearing bracket, a crank formed on the outer extremity of said rod, links connected at their outer ends with the indicators and at their inner ends with the crank, and an operating crank at the inner extremity of said rod, the said operating crank being movable for rotating the rod and swinging the said indicators to respectively project laterally at each side of the vehicle.

3. A traffic signal for motor vehicles including brackets connected at opposite sides of the vehicle, pintles upstanding from the brackets, companion indicators mounted to swing horizontally upon the brackets and each including a shank formed at its inner end with a sleeve loosely fitting over one of said pintles, an operating rod journaled upon the vehicle and provided at its outer extremity with a crank, loops formed on the shanks of the said indicators, and links freely engaged at their outer ends in said loops and connected at their inner ends to the crank of said rod, the rod being rotatable for swinging the indicators to respectively project laterally at each side of the vehicle.

In testimony whereof I affix my signature.

LEON J. HYATT. [L. S.]

Copies of this patent may be obtained for five cents each, by addressing the "Commissioner of Patents, Washington, D. C."